United States Patent
Anan

(10) Patent No.: US 9,483,011 B2
(45) Date of Patent: Nov. 1, 2016

(54) MOTOR CONTROL DEVICE, IMAGE FORMING APPARATUS, MOTOR CONTROL METHOD, METHOD FOR CONTROLLING IMAGE FORMING APPARATUS

(71) Applicant: KYOCERA Document Solutions Inc., Osaka-shi, Osaka (JP)

(72) Inventor: Naohiro Anan, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/911,704

(22) PCT Filed: Jun. 12, 2015

(86) PCT No.: PCT/JP2015/067009
§ 371 (c)(1),
(2) Date: Feb. 11, 2016

(87) PCT Pub. No.: WO2016/009758
PCT Pub. Date: Jan. 21, 2016

(65) Prior Publication Data
US 2016/0202654 A1   Jul. 14, 2016

(30) Foreign Application Priority Data

Jul. 14, 2014  (JP) .................. 2014-143874
Jul. 29, 2014  (JP) .................. 2014-153559

(51) Int. Cl.
*H02P 6/06* (2006.01)
*H02P 23/22* (2016.01)
(Continued)

(52) U.S. Cl.
CPC ............ *G03G 15/757* (2013.01); *H02K 29/14* (2013.01); *H02P 6/06* (2013.01); *H02P 23/0077* (2013.01); *H02P 23/16* (2016.02); *H02P 23/22* (2016.02); *H02P 29/00* (2013.01)

(58) Field of Classification Search
CPC ...... H02P 6/06; H02P 23/0077; H02P 23/16; H02P 23/22
USPC ........ 318/437, 560, 561, 565, 599, 602, 608
See application file for complete search history.

(56) References Cited

U.S. PATENT DOCUMENTS 3,753,067 A     8/1973   Milligan
7,885,587 B2 *  2/2011   Matsuda ............ G03G 15/5008
                                                    399/301

(Continued)

FOREIGN PATENT DOCUMENTS

JP    06165556 A   6/1994
JP    09009666 A   1/1997

(Continued)

OTHER PUBLICATIONS

ISA Japan Patent Office, International Search Report of PCT/JP2015/067009, Aug. 18, 2015, 4 pages.

*Primary Examiner* — Bentsu Ro
(74) *Attorney, Agent, or Firm* — Alleman Hall McCoy Russell & Tuttle LLP

(57) ABSTRACT

A target cycle recording portion (821) records target cycle data (Tref) into a first ring buffer (824) each time a reference pulse signal (Ps) is generated, thereby recording the target cycle data (Tref) sequentially into the first ring buffer (824). A measured cycle recording portion (822) records measured cycle data (Tenc) into a second ring buffer (825) each time an encoder pulse signal (Pe) is generated, thereby recording the measured cycle data (Tenc) sequentially into the second ring buffer (825). A phase error calculating portion (823) calculates a phase error PHE by integrating a difference between the target cycle data (Tref) and the measured cycle data (Tenc) that are sequentially recorded in data buffers respectively in correspondence with each other in the two ring buffers.

7 Claims, 10 Drawing Sheets

(51) Int. Cl.
*G03G 15/00* (2006.01)
*H02P 29/00* (2016.01)
*H02K 29/14* (2006.01)
*H02P 23/00* (2016.01)

(56) References Cited

U.S. PATENT DOCUMENTS 8,229,326 B2 * 7/2012 Anan .................. G03G 15/5008
 399/167

8,553,056 B2 * 10/2013 Hanabusa .................. B41J 2/45
 347/197

2012/0223994 A1 9/2012 Yuda et al.
2013/0200838 A1 8/2013 Seki et al.

FOREIGN PATENT DOCUMENTS

| JP | 11341854 A | 12/1999 |
| JP | 2012179884 A | 9/2012 |
| JP | 2012253542 A | 12/2012 |
| JP | 2013162694 A | 8/2013 |

* cited by examiner

MOTOR CONTROL DEVICE, IMAGE FORMING APPARATUS, MOTOR CONTROL METHOD, METHOD FOR CONTROLLING IMAGE FORMING APPARATUS

TECHNICAL FIELD

The present invention relates to a motor control device, an image forming apparatus using the motor control device to control a motor for driving an image carrying member, a motor control method, and a method for controlling an image forming apparatus.

BACKGROUND ART

In an electrophotographic image forming apparatus, power supplied to a motor that drives a drum-like image carrying member is adjusted, and thereby the rotation speed and the rotation direction (orientation) of the image carrying member is controlled.

It is known, for example, that the motor can be controlled by a feedback control for adjusting the power supplied to the motor in a direction where a difference between a target position and a measured position (detected position) of the motor is reduced. The target position is obtained by counting edges of a reference pulse signal. In addition, the measured position is obtained by counting edges of an encoder pulse signal that is synchronized with the rotation of the motor. The encoder pulse signal is output from an encoder attached to the motor.

CITATION LIST

Patent Literature

[PTL 1] Japanese Laid-Open Patent Publication No. 2013-162694

SUMMARY OF THE INVENTION

Problems to be Solved by the Invention

Meanwhile, when a difference in count number between the reference pulse signal and the encoder pulse signal is used as a deviation in the feedback control of the motor, a deviation below one pulse becomes a dead zone in the motor control. In this case, it is difficult to maintain the deviation at below one pulse, and since the resolution of the position measurement based on the encoder pulse signal becomes a hindrance, it is difficult to control the position of the motor with a high precision.

On the other hand, a difference in generation cycle between two pulse signals may be used as a deviation in the feedback control of the motor. In this case, when the deviation exceeds a generation cycle of either one of the two pulse signals, information of the difference between the target position and the measured position is lost. As a result, in the case where, as in the start or stop of the motor, the difference between the target position and the measured position becomes large, the position of the motor cannot be controlled.

The present invention has been made in view of such conventional circumstances, and it is an object of the present invention to provide a motor control device, an image forming apparatus, a motor control method, and a method for controlling an image forming apparatus that can control the position of the motor with a high precision even when the rotation speed of the motor is changed.

Solution to the Problems

A motor control device according to one aspect of the present invention includes a target cycle recording portion, a measured cycle recording portion, a phase error calculating portion, and a power adjustment portion. The target cycle recording portion records target cycle data into one of three or more first data buffers of a first ring buffer each time a reference pulse signal is generated, thereby recording the target cycle data sequentially into the three or more first data buffers, the target cycle data representing a time period that has passed from a previous generation of a reference pulse signal. The measured cycle recording portion records measured cycle data into one of three or more second data buffers of a second ring buffer each time an encoder pulse signal is generated in synchronization with rotation of a motor, thereby recording the measured cycle data sequentially into the three or more second data buffers, the measured cycle data representing a time period that has passed from a previous generation of an encoder pulse signal, the first data buffers and the second data buffers being same in number. The phase error calculating portion calculates a phase error by integrating a difference between the target cycle data and the measured cycle data that are sequentially recorded in the first data buffers and the second data buffers respectively in correspondence with each other in the first ring buffer and the second ring buffer. The power adjustment portion adjusts power supplied to the motor, in a direction where the phase error is reduced.

A motor control device according to another aspect of the present invention includes the target cycle recording portion, the measured cycle recording portion, the phase error calculating portion, an error pulse counting portion, a first power adjustment portion, and a second power adjustment portion. The error pulse counting portion counts the number of error pulses of the encoder pulse signal with respect to the reference pulse signal. The first power adjustment portion, when the number of error pulses is less than the number of the first data buffers, adjusts power supplied to the motor in a direction where the phase error is reduced. The second power adjustment portion, when the number of error pulses is equal to or more than the number of the first data buffers, adjusts the power supplied to the motor in a direction where the number of error pulses is reduced.

An image forming apparatus according to a still another aspect of the present invention includes an image carrying member, a motor configured to drive the image carrying member, an encoder, and the motor control device. The encoder outputs an encoder pulse signal in synchronization with rotation of the motor. The motor control device adjusts the power supplied to the motor.

A motor control method according to a further aspect of the present invention includes a target cycle recording step, a measured cycle recording step, a phase error calculating step, and a power adjustment step. The target cycle recording step is a step of recording target cycle data into one of three or more first data buffers of a first ring buffer each time a reference pulse signal is generated, thereby recording the target cycle data sequentially into the three or more first data buffers, the target cycle data representing a time period that has passed from a previous generation of a reference pulse signal. The measured cycle recording step is a step of recording measured cycle data into one of three or more second data buffers of a second ring buffer each time an encoder pulse signal is generated in synchronization with rotation of a motor, thereby recording the measured cycle data sequentially into the three or more second data buffers, the measured cycle data representing a time period that has passed from a previous generation of an encoder pulse signal, the first data buffers and the second data buffers being same in number. The phase error calculating step is a step of calculating a phase error by integrating a difference between the target cycle data and the measured cycle data that are sequentially recorded in the first data buffers and the second data buffers respectively in correspondence with each other in the first ring buffer and the second ring buffer. The power adjustment step is a step of adjusting power supplied to the motor, in a direction where the phase error is reduced.

A motor control method according to a still further aspect of the present invention includes the target cycle recording step, the measured cycle recording step, the phase error calculating step, an error pulse counting step, a first power adjustment step, and a second power adjustment step. The error pulse counting step is a step of counting the number of error pulses of the encoder pulse signal with respect to the reference pulse signal. The first power adjustment step is a step of, when the number of error pulses is less than the number of the first data buffers, adjusting power supplied to the motor in a direction where the phase error is reduced. The second power adjustment step is a step of, when the number of error pulses is equal to or more than the number of the first data buffers, adjusting the power supplied to the motor in a direction where the number of error pulses is reduced.

A method for controlling an image forming apparatus according to a still further aspect of the present invention is a method for controlling an image forming apparatus that includes an image carrying member, a motor configured to drive the image carrying member, and an encoder configured to output an encoder pulse signal in synchronization with rotation of the motor. In this control method, power supplied to the motor is adjusted by the motor control method.

Advantageous Effects of the Invention

According to the present invention, it is possible to provide a motor control device, an image forming apparatus, a motor control method, and a method for controlling an image forming apparatus that can control the position of the motor with a high precision even when the rotation speed of the motor is changed.

DESCRIPTION OF EMBODIMENTS

The following describes embodiments of the present disclosure with reference to the attached drawings. It should be noted that the following embodiments are examples of specific embodiments of the present invention and should not limit the technical scope of the present invention.

First Embodiment

Figure 1:
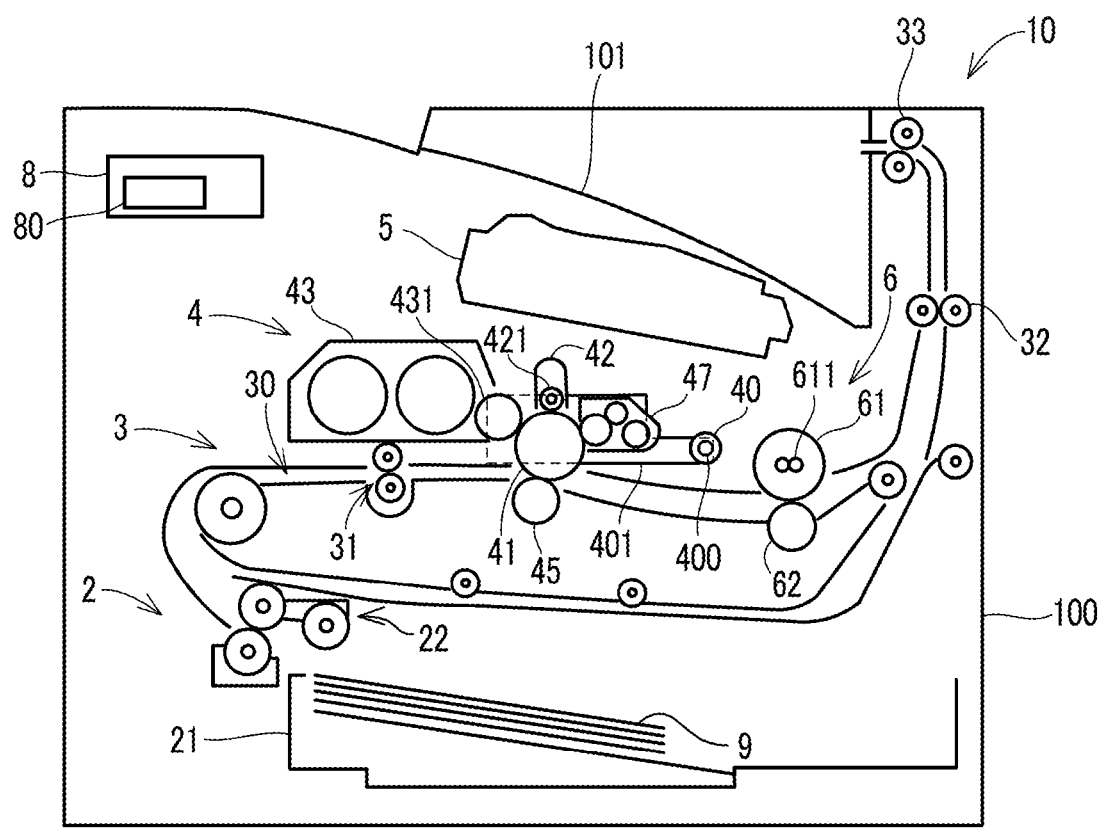
FIG. 1 is a configuration diagram of an image forming apparatus according to a first embodiment of the present invention.

First, a description is given of a image forming apparatus 10 according to the first embodiment of the present invention. The image forming apparatus 10 is an electrophotographic image forming apparatus. As shown in FIG. 1, the image forming apparatus 10 includes, in a housing 100, a sheet supply portion 2, a sheet conveying portion 3, an image forming portion 4, a laser scanning portion 5, a fixing device 6, and a control portion 8.

It is noted that the image forming apparatus 10 is, for example, a printer, a copier, a facsimile, or a multifunction peripheral. The multifunction peripheral is an apparatus that has a function of the printer, a function of the copier, and the like.

The sheet supply portion 2 includes a sheet receiving portion 21 and a sheet feed portion 22. The sheet receiving portion 21 is configured to store a plurality of recording sheets 9 stacked therein. The recording sheet 9 is a sheet-like image formation medium such as a sheet of paper, a sheet of coated paper, a postcard, an envelope, or an OHP sheet.

The sheet feed portion 22 is configured to feed a recording sheet 9 from the sheet receiving portion 21 to a conveyance path 30, by rotating while in contact with the recording sheet 9.

The sheet conveyance portion 3 includes a registration roller 31, a conveyance roller 32, and a discharge roller 33. The registration roller 31 and the conveyance roller 32 convey the recording sheet 9 supplied from the sheet supply portion 2, toward the image forming portion 4. Furthermore, the discharge roller 33 discharges the recording sheet 9 after image formation, onto a discharge tray 101 from a discharge port of the conveyance path 30.

The image forming portion 4 forms an image on a surface of the recording sheet 9 that is moving in the conveyance path 30 after being fed from the sheet feed portion 22. The image forming portion 4 includes a drum-like photoconductor 41, a charging portion 42, a developing portion 43, a transfer portion 45, a cleaning portion 47, a motor 40, and a rotation drive mechanism 401. It is noted that the photoconductor 41 is an example of the image-carrying member.

The photoconductor 41 rotates, and the charging portion 42 uniformly charges the surface of the photoconductor 41. In the charging portion 42, a charging roller 421 included in the charging portion 42 rotates facing the rotating photoconductor 41 and thereby charges the photoconductor 41.

The laser scanning portion 5 writes an electrostatic latent image on the photoconductor 41 by scanning a laser beam thereon. The developing device 43 includes a developing roller 431 for developing the electrostatic latent image by supplying developer to the photoconductor 41.

The transfer portion 45 transfers the image (developer) on the surface of the photoconductor 41 to the recording sheet 9 that is moving in the conveyance path 30. Lastly, the cleaning portion 47 removes the residual developer from the surface of the photoconductor 41.

The motor 40 drives the photoconductor 41 and other rotators disposed around it. As one example, the motor 40 is a driving source for driving the photoconductor 41, the charging roller 421, and the developing roller 431. The rotation drive mechanism 401 is a gear mechanism that operates in conjunction with the motor 40, and transmits a rotational force of the motor 40 to the photoconductor 41 and other rotators disposed around it.

The motor 40 is a servo motor, and is, for example, a DC motor such as a DC brushless motor. An encoder 400 is attached to the motor 40. The encoder 400 outputs an encoder pulse signal Pe (see FIG. 2) which is a pulse signal generated in synchronization with the rotation of the motor 40.

The encoder pulse signal Pe is generated each time the motor 40 rotates a unit angle. The unit angle is determined based on the resolution of the encoder 400. The encoder pulse signal is input to the control portion 8.

In the fixing device 6, a heating roller 61 having a heater 611 therein and a pressure roller 62 disposed to face the heating roller 61 send the recording sheet 9 with an image formed thereon to a downstream process while nipping the recording sheet 9 therebetween. This allows the fixing device 6 to heat the developer on the recording sheet 9 and fix the image to the recording sheet 9.

The control portion 8 includes a motor control device 80 for controlling the motor 40. The control portion 8 further includes a MPU (Micro Processor Unit), a memory, and a signal interface for controlling devices, other than the motor 40, included in the image forming apparatus 10.

The motor control device 80 controls the rotation speed and rotation direction (orientation) of the motor 40 by adjusting the power supplied to the motor 40. That is, the motor control device 80 performs a feedback control in a direction where a difference between a target position and a measured position (detected position) of the motor 40 is reduced. The target position is given as a reference pulse signal Ps (see FIG. 2) that is described below.

Meanwhile, when a difference in count number between the reference pulse signal Ps and the encoder pulse signal Pe is used as a deviation in the feedback control of the motor 40, a deviation below one pulse becomes a dead zone in the motor control. In this case, it is difficult to maintain the deviation at below one pulse, and since the resolution of the position measurement based on the encoder pulse signal becomes a hindrance, it is difficult to control the position of the motor 40 with a high precision.

In addition, a difference in generation cycle between two pulse signals (the reference pulse signal Ps and the encoder pulse signal Pe) may be used as a deviation in the feedback control of the motor. In this case, when the deviation exceeds a generation cycle of either one of the two pulse signals, information of the difference between the target position and the measured position is lost. As a result, in the case where, as in the start or stop of the motor 40, the difference between the target position and the measured position becomes large, the position of the motor cannot be controlled.

On the other hand, the motor control device 80 according to the present embodiment is configured as described below so as to be able to control the position of the motor 40 with a high precision even when the rotation speed of the motor 40 is changed.

[Details of Motor Control Device]

Figure 2:
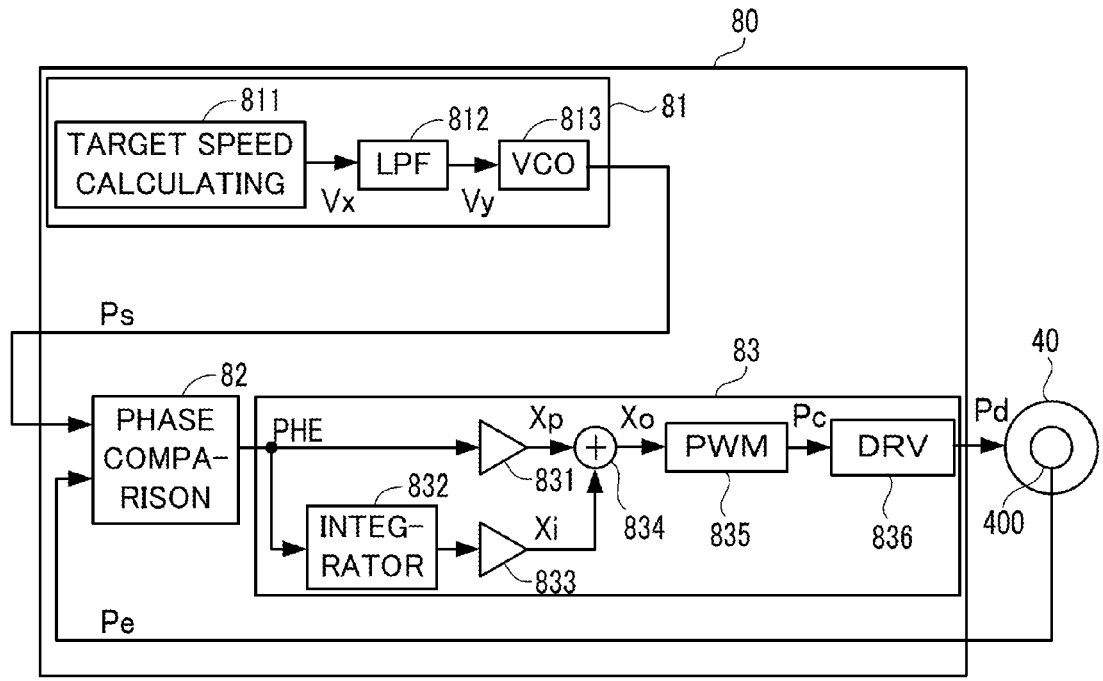
FIG. 2 is a block diagram of a motor control device according to the first embodiment of the present invention.

Next, the motor control device 80 is described in detail with reference to FIGS. 2-6. As shown in FIG. 2, the motor control device 80 includes a reference pulse generating portion 81, a phase comparison portion 82, and a motor power adjustment portion 83.

The reference pulse generating portion 81 generates the reference pulse signal Ps that becomes a reference of the target position of the motor 40 in the rotation direction. The reference pulse generating portion 81 includes, for example, a target speed calculating portion 811, a lowpass filter processing portion 812, and a voltage control oscillator 813. The target speed calculating portion 811 calculates a primary target speed Vx which is a rotation speed of the motor 40 that is required for the photoconductor 41 to operate in accordance with a predetermined rule.

The lowpass filter processing portion 812 performs a lowpass filter process onto a signal of a level that corresponds to the primary target speed Vx. The voltage control oscillator 813 generates the reference pulse signal Ps which is a pulse signal of a frequency that corresponds to a secondary target speed Vy which is a rotation speed after the lowpass filter process.

The phase comparison portion 82 calculates a phase error PHE which is an integrated value of a phase difference between the reference pulse signal Ps and the encoder pulse signal Pe. The phase comparison portion 82 is described in detail below.

The motor power adjustment portion 83 adjusts the power supplied to the motor 40, in a direction where the phase error PHE is reduced. The motor power adjustment portion 83 includes, for example, a proportional element amplifier 831, an integrator 832, an integral element amplifier 833, an adder 834, a pulse width modulating portion 835, and a motor driving circuit 836. It is noted that the "direction where the phase error PHE is reduced" may also be referred to as a "direction where the phase error PHE is converged into 0" or a "direction where the phase error PHE is eliminated".

The proportional element amplifier 831 amplifies a signal corresponding to the phase error PHE with a predetermined proportional gain, and thereby generates a proportional control signal Xp which reflects the proportional element of the phase error PHE.

The integrator 832 performs an integration process on the signal corresponding to the phase error PHE. In addition, the integral element amplifier 833 amplifies the signal corresponding to the phase error PHE with a predetermined integral gain, and thereby generates an integral control signal Xi which reflects the integral element of the phase error PHE.

The adder 834 adds the proportional control signal Xp and the integral control signal Xi, and thereby generates a power supply amount signal Xo which represents the size of the power supplied to the motor 40. That is, the proportional element amplifier 831, the integrator 832, the integral element amplifier 833, and the adder 834 constitute a control portion that adjusts the power supplied to the motor 40, by the so-called PI control.

The pulse width modulating portion 835 performs a pulse width modulation process onto the power supply amount signal Xo, and thereby generates a pulse width modulated signal Pc whose pulse width has been adjusted with a duty ratio that corresponds to the level of the power supply amount signal Xo.

The motor driving circuit 836 generates a drive pulse signal Pd in synchronization with the pulse width modulated signal Pc, the drive pulse signal Pd being a pulse-like power signal for driving the motor. The drive pulse signal Pd is supplied to the motor 40.

That is, the pulse width modulating portion 835 adjusts the duty ratio of the drive pulse signal Pd that is supplied to the motor 40, based on the input signal (the power supply amount signal Xo) that reflects the proportional element and the integral element of the phase error PHE. This allows the power supplied to the motor 40 to be adjusted based on the phase error PHE.

It is noted that the step in which the motor power adjustment portion 83 adjusts the power supplied to the motor 40 is an example of the power adjustment step. In addition, the step in which the pulse width modulating portion 835 adjusts the duty ratio of the drive pulse signal Pd is an example of the pulse width modulation step.

The components of the motor control device 80 other than the motor driving circuit 836 are a combination of a microcomputer, an ASIC (Application Specific Integrated Circuit), and other semiconductor devices and other electronic circuits. In addition, the various calculations disclosed below may be realized as the microprocessor executes one or more programs that have been stored in the memory in advance, or may be realized by hardware such as a logical operation circuit.

Figure 3:
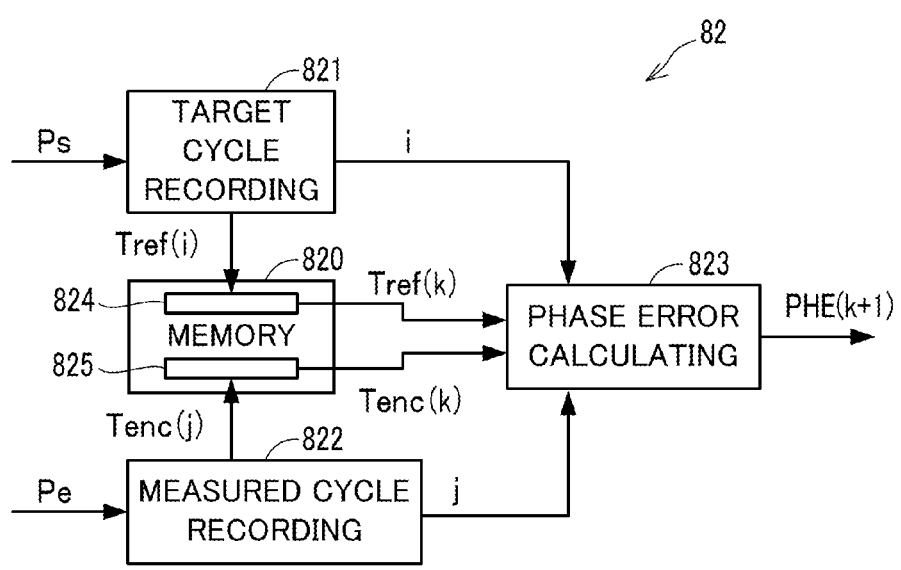
FIG. 3 is a block diagram of a phase comparison portion of the motor control device according to the first embodiment of the present invention.

As shown in FIG. 3, the phase comparison portion 82 includes a memory 820, a target cycle recording portion 821, a measured cycle recording portion 822, and a phase error calculating portion 823. The memory 820 is a data storage medium that is accessed by the target cycle recording portion 821, the measured cycle recording portion 822, and the phase error calculating portion 823. The data storage area of the memory 820 includes an area of a first ring buffer 824 and an area of a second ring buffer 825.

Figure 4:
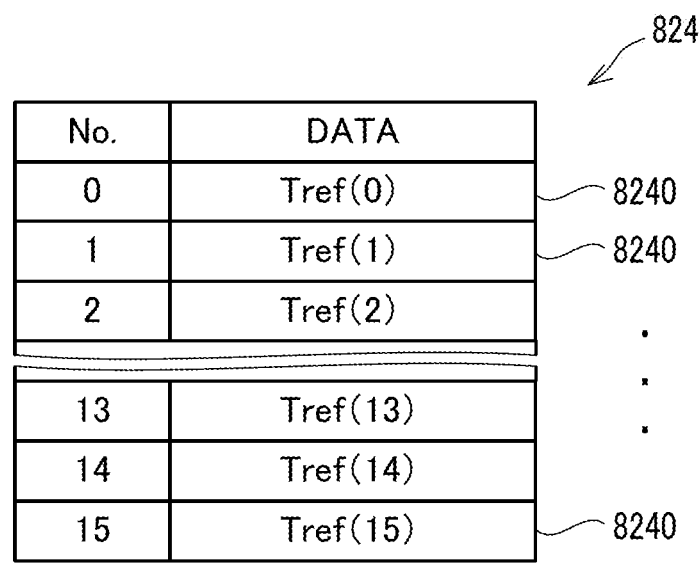
FIG. 4 is a diagram showing a memory map of a first ring buffer in the phase comparison portion of the motor control device according to the first embodiment of the present invention.
Figure 5:
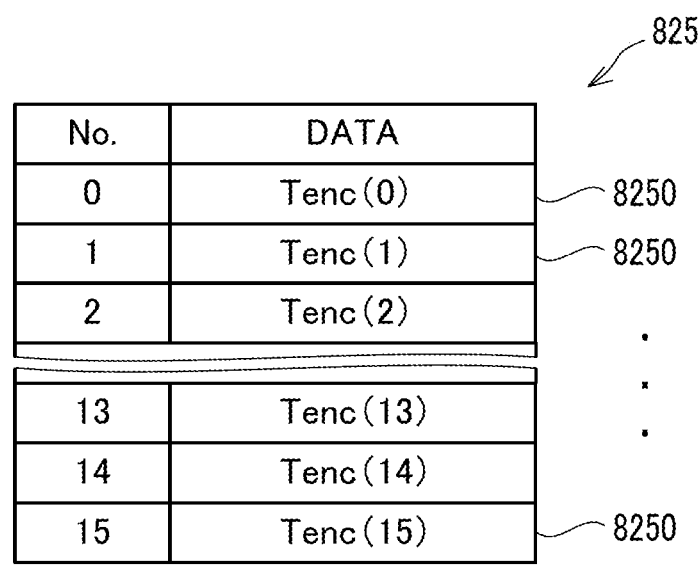
FIG. 5 is a diagram showing a memory map of a second ring buffer in the phase comparison portion of the motor control device according to the first embodiment of the present invention.

FIGS. 4 and 5 are diagrams respectively showing examples of memory maps of the first ring buffer 824 and the second ring buffer 825. The first ring buffer 824 includes three or more data buffers. In addition, the second ring buffer 825 includes as many data buffers as the first ring buffer 824.

In the following description, the data buffers included in the first ring buffer 824 are referred to as first data buffers 8240. Similarly, the data buffers included in the second ring buffer 825 are referred to as second data buffers 8250. FIG. 4 shows a memory map of the first ring buffer 824 that includes 16 first data buffers 8240 that are assigned with buffer numbers 0 to 15. Similarly, FIG. 5 shows a memory map of the second ring buffer 825 that includes 16 second data buffers 8250 that are assigned with buffer numbers 0 to 15. It is noted that the data buffers 3 to 12 are omitted in FIGS. 4 and 5.

In the following, processes of the target cycle recording portion 821, the measured cycle recording portion 822, and the phase error calculating portion 823 are explained in more detail, with reference to the time chart of FIG. 6. It is noted that FIG. 6 shows an example where a phase delay of the encoder pulse signal Pe with respect to the reference pulse signal Ps has occurred.

Figure 6:
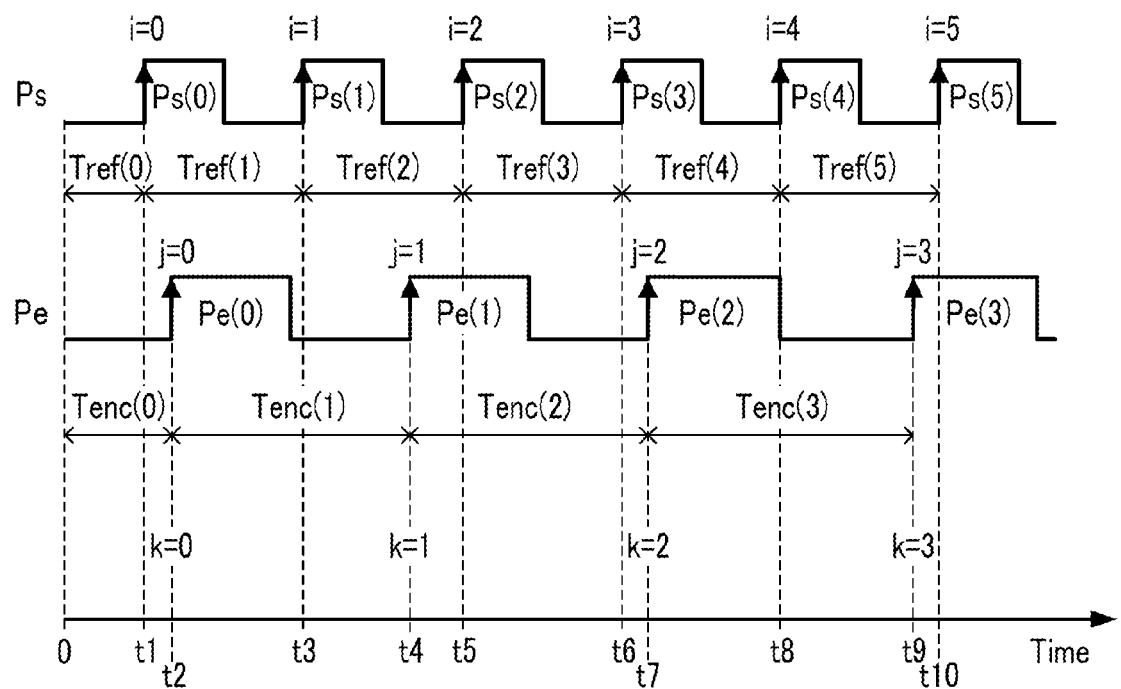
FIG. 6 is a diagram showing an example of a time chart of a reference pulse signal and an encoder pulse signal that are input into the phase comparison portion of the motor control device according to the first embodiment of the present invention.

In addition, according to the example shown in FIG. 6, for the sake of convenience, the phase delay of the encoder pulse signal Pe with respect to the reference pulse signal Ps increases with time. However, in reality, the phase difference is decreased by the control of the motor control device 80.

In the following description, "i", "j", and "k" each represent an integer variable that is counted up one by one from 0 and circulates in a range of 0 to 15. That is, the variables "i", "j", and "k" return to 0 when they are counted up by one from 15. In other words, when i=0, i−1=15.

The target cycle recording portion 821 records target cycle data Tref into one of the first data buffers 8240 each time a reference pulse signal Ps is generated, wherein the target cycle data Tref represents a time period that has passed from the previous generation of a reference pulse signal Ps. Accordingly, the target cycle recording portion 821 records the target cycle data Tref sequentially into the first data buffers 8240 of the first ring buffer 824. At each recording of the target cycle data Tref, the target cycle recording portion 821 notifies the phase error calculating portion 823 of the buffer number of the first data buffer 8240 in which the latest piece of target cycle data Tref is recorded.

It is noted that the step in which the target cycle recording portion 821 calculates and records the target cycle data Tref is an example of the target cycle recording step.

In the example of FIG. 6, at timings t1, t3, t5, t6, t8, and t10 of the rising edge of the reference pulse signal Ps, the target cycle recording portion 821 respectively records 6 pieces of target cycle data Tref that are obtained at those timings, into the first data buffers 8240 of the buffer numbers 0 to 5. Furthermore, at the timings t1, t3, t5, t6, t8, and t10, the target cycle recording portion 821 notifies the phase error calculating portion 823 of the buffer numbers 0, 1, 2, 3, 4, and 5 that are assigned to the first data buffers 8240 in which the pieces of target cycle data Tref obtained at those timings are recorded.

An $i^{th}$ target cycle data Tref (i) is recorded when an $i^{th}$ reference pulse signal Ps (i) is generated, wherein the $i^{th}$ target cycle data Tref (i) represents a time period that has passed from a time when the $(i-1)^{th}$ reference pulse signal Ps (i−1) was generated to a time when an $i^{th}$ reference pulse signal Ps (i) is generated. It is noted that a target cycle data Tref (0), which is the initial value of the target cycle data, represents a time period that has passed from the start of the process to a time when the first, namely, a $0^{th}$ reference pulse signal Ps (0) is generated.

The measured cycle recording portion 822 records measured cycle data Tenc into one of the second data buffers 8250 each time an encoder pulse signal Pe is generated, wherein the measured cycle data Tenc represents a time period that has passed from the previous generation of an encoder pulse signal Pe. Accordingly, the measured cycle recording portion 822 sequentially records the measured cycle data Tenc into the second data buffers 8250 of the second ring buffer 825. At each recording of the measured cycle data Tenc, the measured cycle recording portion 822 notifies the phase error calculating portion 823 of the buffer number of second data buffers 8250 in which the latest piece of measured cycle data Tenc is recorded.

It is noted that the step in which the measured cycle recording portion 822 calculates and records the measured cycle data Tenc is an example of the measured cycle recording step.

In the example of FIG. 6, at timings t2, t4, t7, and t9 of the rising edge of the encoder pulse signal Pe, the measured cycle recording portion 822 records pieces of measured cycle data Tenc that are obtained at those timings, into the second data buffers 8250 of buffer numbers 0 to 3. Furthermore, at the timings t2, t4, t7, and t9, the measured cycle recording portion 822 notifies the phase error calculating portion 823 of buffer numbers 0, 1, 2, and 3 that are assigned to the second data buffers 8250 in which the pieces of measured cycle data Tenc obtained at those timings are recorded.

A $j^{th}$ measured cycle data Tenc (j) that is recorded when a $j^{th}$ encoder pulse signal Pe (j) is generated, represents a time period that has passed from a time when a $(j-1)^{th}$ encoder pulse signal Pe (j−1) was generated to a time when the $j^{th}$ encoder pulse signal Pe (j) is generated. It is noted that a measured cycle data Tenc (0), which is the initial value of the measured cycle data, represents a time period that has passed from the start of the process to a time when the first, namely, a $0^{th}$ encoder pulse signal Pe (0) is generated.

It is noted that the target cycle data Tref (i) and the measured cycle data Tenc (j) may be numerical data that represents the time in units of, for example, milliseconds, or numerical data that represents the number of counts of a predetermined clock signal.

The phase error calculating portion 823 calculates the phase error PHE by integrating a difference between the target cycle data Tref and the measured cycle data Tenc that are sequentially recorded in the first data buffers 8240 and the second data buffers 8250 in correspondence with each other in the first ring buffer 824 and the second ring buffer 825, respectively.

The first data buffer 8240 and the second data buffer 8250 into which the target cycle data Tref and the measured cycle data Tenc are recorded at the same timing correspond to each other. That is, in the above-mentioned example, the $0^{th}$, $1^{st}$, $2^{nd}$, . . . $15^{th}$ first data buffers 8240 correspond to the $0^{th}$, $1^{st}$, $2^{nd}$, . . . $15^{th}$ second data buffers 8250, respectively.

The phase error calculating portion 823 calculates the phase error PHE each time data is recorded into both the first ring buffer 824 and the second ring buffer 825 that correspond to each other.

More specifically, the phase error calculating portion 823 calculates a $(k+1)^{th}$ phase error PHE (k+1) using the following equation (1) each time data is recorded into both $k^{th}$ ($0^{th}$ to $15^{th}$) first ring buffer 824 and $k^{th}$ ($0^{th}$ to $15^{th}$) second ring buffer 825. It is noted that the initial value of a phase error PHE (0) is 0.

[Equation 1]

$$PHE(k+1)=Tref(k)-Tenc(k)+PHE(k) \quad (1)$$

The equation (1) is used to integrate a difference between the target cycle data Tref and the measured cycle data Tenc that are sequentially recorded in the first data buffers 8240 and the second data buffers 8250 in correspondence with each other in the first ring buffer 824 and the second ring buffer 825, respectively. The phase error PHE, which is an integrated value of the difference, corresponds to an error (positional error) of the measured position with respect to the target position of the motor 40 in the rotation direction of the motor 40. The phase error PHE, different from a general phase error that changes only in a range of less than one cycle of the reference pulse signal Ps, can change in a range that exceeds one cycle of the reference pulse signal Ps.

When the phase error PHE (k+1) calculated using the equation (1) is 0, the reference pulse signal Ps matches the encoder pulse signal Pe in phase. When the phase error PHE (k+1) calculated using the equation (1) is a positive value, the reference pulse signal Ps is advanced in phase with respect to the encoder pulse signal Pe. When the phase error PHE (k+1) calculated using the equation (1) is a negative value, the reference pulse signal Ps is delayed in phase with respect to the encoder pulse signal Pe.

For example, when the reference pulse signal Ps matches or is advanced in phase with respect to the encoder pulse signal Pe, the phase error calculating portion 823, each time it receives a number "j" from the measured cycle recording portion 822, sets k=j and calculates the $(k+1)^{th}$ phase error PHE (k+1).

On the other hand, when the reference pulse signal Ps is delayed in phase with respect to the encoder pulse signal Pe, the phase error calculating portion 823, each time it receives a number "i" from the target cycle recording portion 821, sets k=i and calculates the $(k+1)^{th}$ phase error PHE (k+1).

It is noted that the step in which the phase error calculating portion 823 calculates the phase error PHE is an example of the phase error calculating step.

In the example of FIG. 6, at timing t2, data recording to the $0^{th}$ first data buffer 8240 and the $0^{th}$ second data buffer 8250 corresponding thereto is completed. Thus the phase error calculating portion 823 calculates the $1^{st}$ phase error PHE (1) by applying the $0^{th}$ target cycle data Tref (0) and the $0^{th}$ measured cycle data Tenc (0) to the equation (1).

Similarly, at timing t4, data recording to the $1^{st}$ first data buffer 8240 and the $1^{st}$ second data buffer 8250 corresponding thereto is completed. Thus the phase error calculating portion 823 calculates the 2nd phase error PHE (2) by applying the $1^{st}$ target cycle data Tref (1) and the $1^{st}$ measured cycle data Tenc (1) to the equation (1).

Similarly, at timings t7 and t9, the phase error calculating portion 823 calculates the $3^{rd}$ phase error PHE (3) and the $4^{th}$ phase error PHE (4), respectively.

The phase errors PHE are sequentially calculated as described above, and the latest phase error PHE is input into the motor power adjustment portion 83. With this configuration, the motor power adjustment portion 83 adjusts the power supplied to the motor 40, in a direction where the phase error PHE is reduced.

When the motor control device 80 is adopted, the phase error PHE, which is an integrated value of a difference in generation cycle between the reference pulse signal Ps and the encoder pulse signal Pe, is used as a deviation in the feedback control. As a result, even if the phase error PHE (deviation) is a time difference of less than one pulse, the power supplied to the motor 40 is adjusted in a direction where the time difference is eliminated. As a result, the resolution of the position measurement based on the encoder pulse signal Pe does not become a hindrance to the control ability, and it is possible to control the position of the motor 40 with a high precision.

Furthermore, the latest three or more pieces of target cycle data Tref and the latest three or more pieces of measured cycle data Tenc are respectively stored in two ring buffers. As a result, if the phase difference (deviation) between the reference pulse signal Ps and the encoder pulse signal Pe exceeds a generation cycle of either one of the two pulse signals, the phase error PHE is calculated correctly.

That is, suppose that each of the two ring buffers 824 and 825 has N data buffers, if the phase difference between the two pulse signals becomes (N−1) times the generation cycle of either one of the two pulse signals, information of the difference between the target position and the measured position of the motor 40 is not lost. As a result, the position of the motor 40 can be controlled correctly even in the case where, as in the start or stop of the motor 40, the speed of the motor 40 is relatively largely changed, that is, in the case where the difference between the target position and the measured position becomes large.

In addition, in the motor power adjustment portion 83, the pulse width modulating portion 835 adjusts the duty ratio of the drive pulse signal Pd supplied to the motor 40, based on the input signal (the power supply amount signal Xo) that reflects the proportional element of the phase error PHE. Such a control is effective as a control for reducing the phase error PHE quickly.

In the present embodiment, the pulse width modulating portion 835 adjusts the duty ratio of the drive pulse signal Pd supplied to the motor 40, based on the input signal (the power supply amount signal Xo) that reflects also the integral element of the phase error PHE. This makes it possible to prevent an offset from being generated when the position of the motor 40 is controlled.

Second Embodiment

Figure 7:
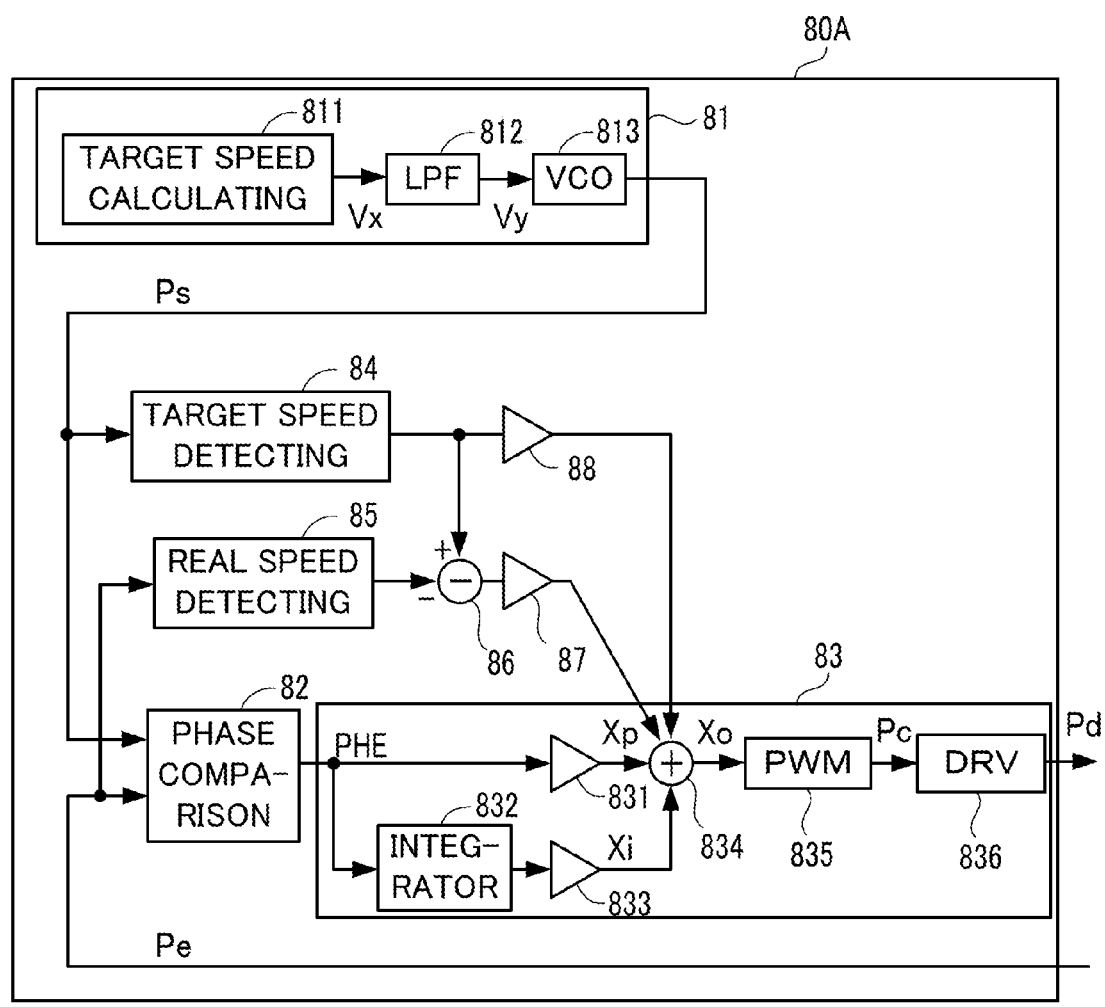
FIG. 7 is a block diagram of a motor control device according to a second embodiment of the present invention.

Next, a description is given of a motor control device 80A according to the second embodiment of the present invention with reference to FIG. 7. FIG. 7 is a block diagram of the motor control device 80A. In FIG. 7, the same components as those shown in FIG. 2 are assigned the same reference signs. The following describes the difference of the motor control device 80A from the motor control device 80.

The motor control device 80A includes, in addition to the components of the motor control device 80, a target speed detecting portion 84, a real speed detecting portion 85, a subtractor 86, a speed feedback control amplifier 87, and a feed-forward control amplifier 88.

The target speed detecting portion 84 detects (calculates) a target rotation speed of the motor 40 by calculating the inverse number of the generation cycle of the reference pulse signal Ps. Similarly, the real speed detecting portion 85 detects (calculates) a real rotation speed of the motor 40 by calculating the inverse number of the generation cycle of the encoder pulse signal Pe.

The subtractor 86 calculates a speed deviation which is a difference between the target rotation speed and the real rotation speed. The speed feedback control amplifier 87 generates a speed control signal that reflects the speed deviation, by amplifying, with a predetermined gain, a signal that corresponds to the speed deviation.

The feed-forward control amplifier 88 generates a feed-forward control signal that reflects a change element of the target rotation speed, by amplifying, with a predetermined gain, a signal that corresponds to the target rotation speed.

The speed control signal and the feed-forward control signal are added by the adder 834 together with the proportional control signal Xp and the integral control signal Xi, and the result is reflected in the power supply amount signal Xo.

It is noted that the image forming apparatus according to the second embodiment of the present invention has the same configuration as the image forming apparatus 10 except that the motor control device 80 is replaced with the motor control device 80A.

As described above, the motor control device 80A performs the feedback control and the feed-forward control based on the rotation speed of the motor 40, in parallel with the feedback control based on the phase error PHE. This makes it possible to reduce the phase error PHE further quickly.

Third Embodiment

Details of Motor Control Device

Figure 8:
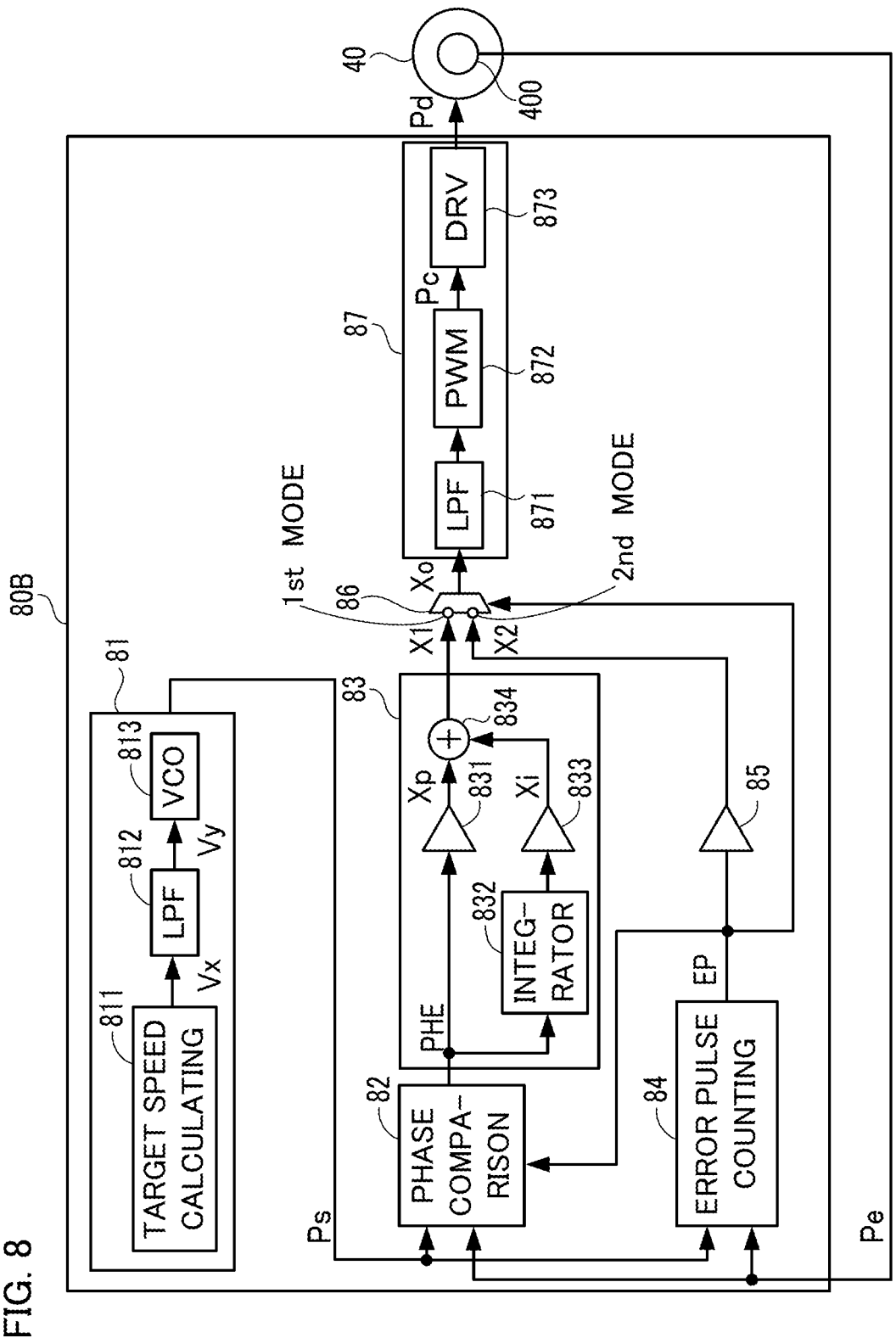
FIG. 8 is a block diagram of a motor control device according to a third embodiment of the present invention.
Figure 9:
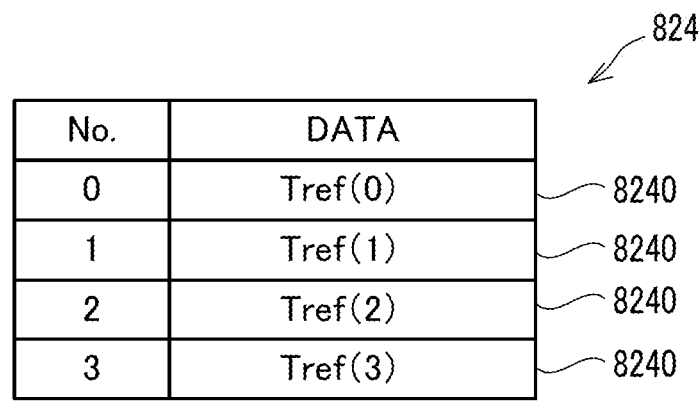
FIG. 9 is a diagram showing a memory map of the first ring buffer in the phase comparison portion of the motor control device according to the third embodiment of the present invention.
Figure 10:
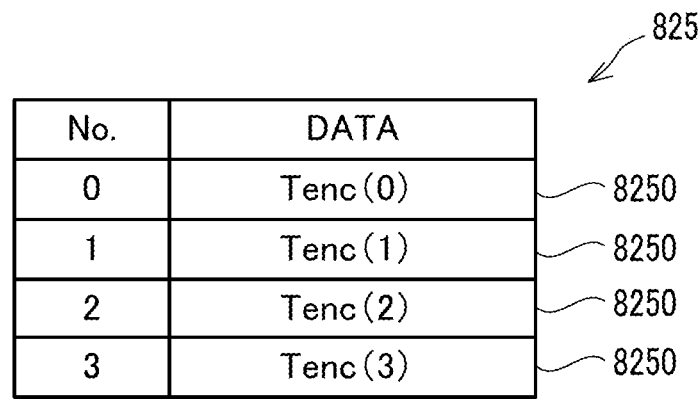
FIG. 10 is a diagram showing a memory map of the second ring buffer in the phase comparison portion of the motor control device according to the third embodiment of the present invention.

Next, a description is given of a motor control device 80B according to the third embodiment of the present invention with reference to FIGS. 8-10. In the present embodiment, the control portion 8 of the image forming apparatus 10 includes the motor control device 80B, instead of the motor control device 80, for controlling the motor 40. As shown in FIG. 8, the motor control device 80B includes a reference pulse generating portion 81, a phase comparison portion 82, a first power adjustment portion 83, an error pulse counting portion 84, a second power adjustment portion 85, a signal selection portion 86, and a motor drive signal generating portion 87. The following describes the difference of the motor control device 80B from the motor control device 80.

As described above, the reference pulse generating portion 81 generates the reference pulse signal Ps that becomes the reference of the target position of the motor 40 in the rotation direction. Furthermore, as described above, the phase comparison portion 82 calculates the phase error PHE which is a phase difference between the reference pulse signal Ps and the encoder pulse signal Pe (see FIG. 8).

The first power adjustment portion 83 generates a first control signal X1 which is a control signal for adjusting the power supplied to the motor 40 in a direction where the phase error PHE is reduced. The first power adjustment portion 83 includes, for example, a proportional element amplifier 831, an integrator 832, an integral element amplifier 833, and an adder 834.

The proportional element amplifier 831 amplifies a signal corresponding to the phase error PHE with a predetermined proportional gain, and thereby generates a proportional control signal Xp which reflects the proportional element of the phase error PHE.

The integrator 832 performs an integration process on a signal corresponding to the phase error PHE. In addition, the integral element amplifier 833 amplifies a signal corresponding to the phase error PHE with a predetermined integral gain, and thereby generates an integral control signal Xi which reflects the integral element of the phase error PHE.

The adder 834 adds the proportional control signal Xp and the integral control signal Xi, and thereby generates the first control signal X1 which represents the size of power supplied to the motor 40.

The first control signal X1 represents the size of the power supplied to the motor 40. The proportional element amplifier 831, the integrator 832, the integral element amplifier 833, and the adder 834 constitute a control portion that adjusts the power supplied to the motor 40, by the so-called PI control.

The error pulse counting portion 84 counts the number of error pulses EP of the encoder pulse signal Pe with respect to the reference pulse signal Ps. The error pulses EP represent a difference of the number of generated encoder pulse signals Pe from the number of generated reference pulse signals Ps. The error pulses EP are input to the second power adjustment portion 85 and the signal selection portion 86. The error pulses EP may further be input to the phase comparison portion 82.

The error pulse EP is a parameter that indicates, by the number of pulses, a deviation of the measured position with respect to the target position of the motor 40 in the rotation direction of the motor 40. The error pulses EP are also called accumulated pulses or deviation pulses. It is noted that a step in which the error pulse counting portion 84 counts the number of error pulses EP is an example of the error pulse counting step.

The second power adjustment portion 85 generates a second control signal X2 which is a control signal for adjusting the power supplied to the motor 40 in a direction where the error pulses EP are reduced. The second control signal X2 represents the size of the power supplied to the motor 40.

The second power adjustment portion 85 is, for example, an amplifier that generates the second control signal X2 by amplifying a signal that corresponds to the error pulse EP, with a predetermined proportional gain.

The signal selection portion 86 selects the first control signal X1 or the second control signal X2 based on the size of the error pulse EP, and outputs the selected signal to the motor drive signal generating portion 87. Hereinafter, the signal selected by the signal selection portion 86 is referred to as a power supply amount signal Xo.

The signal selection portion 86 may be a so-called signal switcher. The method by which the signal selection portion 86 selects a control signal based on the error pulse EP is described below.

The motor drive signal generating portion 87 supplies, to the motor 40, an amount of power that corresponds to the power supply amount signal Xo. The motor drive signal generating portion 87 includes, for example, a lowpass filter processing portion 871, a pulse width modulating portion 872, and a motor driving circuit 873.

The lowpass filter processing portion 871 performs a lowpass filter process onto the power supply amount signal Xo. The power supply amount signal Xo after the lowpass filter process is input to the pulse width modulating portion 872. The lowpass filter processing portion 871 prevents a sudden change of the input signal to the pulse width modulating portion 872 when the selection state of the signal selection portion 86 is changed.

The pulse width modulating portion 872 performs a pulse width modulating process onto the power supply amount signal Xo after the lowpass filter process, and thereby generates the pulse width modulated signal Pc in which the pulse width has been adjusted with a duty ratio that corresponds to the level of the power supply amount signal Xo.

The motor driving circuit 873 generates a drive pulse signal Pd in synchronization with the pulse width modulated signal Pc, the drive pulse signal Pd being a pulse-like power signal for driving the motor. The drive pulse signal Pd is supplied to the motor 40.

In the following description, a control mode of the motor control device 80B when the signal selection portion 86 selects the first control signal X1, is referred to as a first mode. In addition, a control mode of the motor control device 80B when the signal selection portion 86 selects the second control signal X2, is referred to as a second mode.

When the control mode is the first mode, the pulse width modulating portion 872 adjusts the duty ratio of the drive pulse signal Pd supplied to the motor 40, based on the input signal (the first control signal X1) that reflects the proportional element and the integral element of the phase error PHE. With this configuration, the power supplied to the motor 40 is adjusted in a direction where the error pulses EP are reduced. It is noted that the step in which the pulse width modulating portion 872 adjusts the duty ratio of the drive pulse signal Pd is an example of the pulse width modulation step.

On the other hand, when the control mode is the second mode, the pulse width modulating portion 872 adjusts the duty ratio of the drive pulse signal Pd supplied to the motor 40, based on the input signal (the second control signal X2) that reflects the size of the error pulse EP. With this configuration, the power supplied to the motor 40 is adjusted in a direction where the error pulses EP are reduced.

The components of the motor control device 80B other than the motor driving circuit 872 may be composed of, for example, a combination of a microcomputer, an ASIC (Application Specific Integrated Circuit), other semiconductor devices, and other electronic circuits. In addition, the various calculations disclosed below may be realized as the microprocessor executes one or more programs that have been stored in the memory in advance, or may be realized by hardware such as a logical operation circuit.

As shown in FIG. 3, the phase comparison portion 82 includes a memory 820, a target cycle recording portion 821, a measured cycle recording portion 822, and a phase error calculating portion 823. The memory 820 is a data storage medium that is accessed by the target cycle recording portion 821, the measured cycle recording portion 822, and the phase error calculating portion 823. The data storage area of the memory 820 includes an area of a first ring buffer 824 and an area of a second ring buffer 825.

FIGS. 9 and 10 are diagrams respectively showing examples of memory maps of the first ring buffer 824 and the second ring buffer 825. The first ring buffer 824 includes three or more data buffers. In addition, the second ring buffer 825 includes as many data buffers as the first ring buffer 824.

In the following description, the data buffers included in the first ring buffer 824 are referred to as first data buffers 8240. Similarly, the data buffers included in the second ring buffer 825 are referred to as second data buffers 8250. FIG. 9 shows a memory map of the first ring buffer 824 that includes four first data buffers 8240 that are assigned with buffer numbers 0 to 3. Similarly, FIG. 10 shows a memory map of the second ring buffer 825 that includes four second data buffers 8250 that are assigned with buffer numbers 0 to 3.

In the following, processes of the target cycle recording portion 821, the measured cycle recording portion 822, and the phase error calculating portion 823 are explained in more detail, with reference to the time chart of FIG. 11. It is noted that FIG. 11 shows an example where a phase delay of the encoder pulse signal Pe with respect to the reference pulse signal Ps has occurred.

Figure 11:
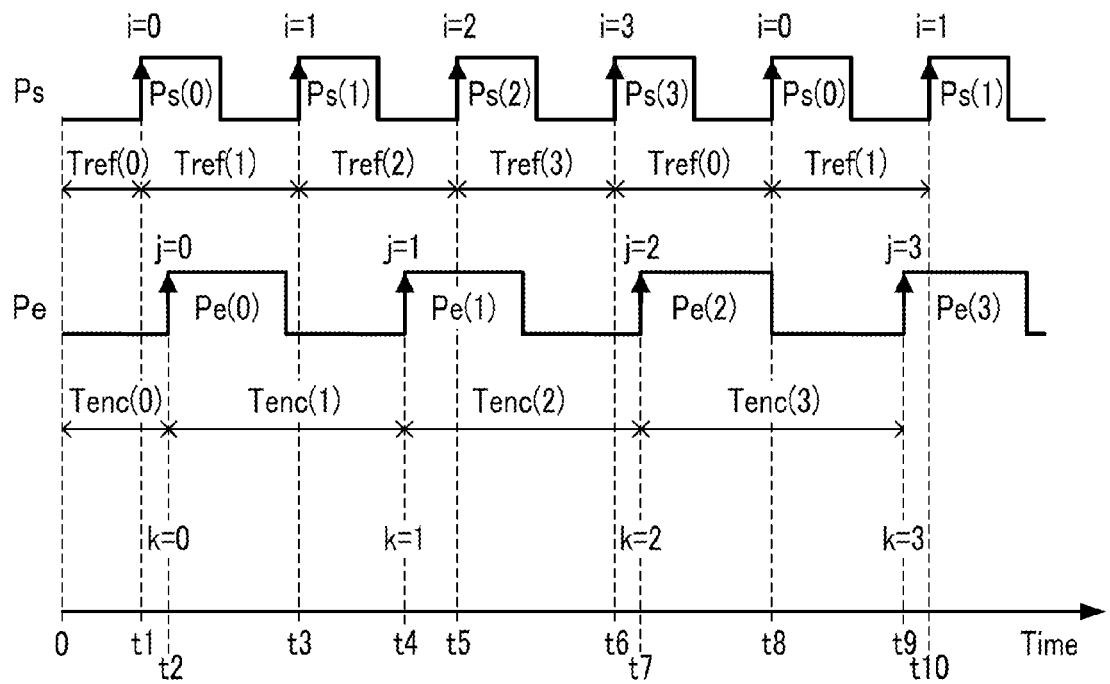
FIG. 11 is a diagram showing an example of a time chart of a reference pulse signal and an encoder pulse signal that are input into the phase comparison portion of the motor control device according to the third embodiment of the present invention.

In addition, according to the example shown in FIG. 11, for the sake of convenience, the phase delay of the encoder pulse signal Pe with respect to the reference pulse signal Ps increases with time. However, in reality, the phase difference is decreased by the control of the motor control device 80.

In the following description, "i", "j", and "k" each represents an integer variable that is counted up from 0 and circulates in a range of 0 to 3. That is, the variables "i", "j", and "k" return to 0 when they are counted up from 3. In other words, when i=0, i−1=3.

The target cycle recording portion 821 records target cycle data Tref into one of the first data buffers 8240 in the first ring buffer 824 each time a reference pulse signal Ps is generated, wherein the target cycle data Tref represents a time period that has passed from the previous pulse generation of a reference pulse signal Ps. Accordingly, the target cycle recording portion 821 sequentially records the target cycle data Tref into the first data buffers 8240 of the first ring buffer 824. At each recording of the target cycle data Tref, the target cycle recording portion 821 notifies the phase error calculating portion 823 of the buffer number of the first data buffers 8240 in which the latest piece of target cycle data Tref is recorded.

It is noted that the step in which the target cycle recording portion 821 calculates and records the target cycle data Tref is an example of the target cycle recording step.

In the example of FIG. 11, at timings 0, t3, t5, t6, t8, and t10 of the rising edge of the reference pulse signal Ps, the target cycle recording portion 821 records pieces of target cycle data Tref that are obtained at those timings, into the first data buffers 8240 of buffer numbers 0, 1, 2, 3, 0, and 1. Furthermore, at the timings t1, t3, t5, t6, t8, and t10, the target cycle recording portion 821 notifies the phase error calculating portion 823 of the buffer numbers 0, 1, 2, 3, 0, and 1 that are assigned to the first data buffers 8240 in which the pieces of target cycle data Tref obtained at those timings are recorded.

An $i^{th}$ target cycle data Tref (i) that is recorded when an $i^{th}$ reference pulse signal Ps (i) is generated, represents a time period that has passed from a time when the $(i-1)^{th}$ reference pulse signal Ps (i−1) was generated to a time when the $i^{th}$ reference pulse signal Ps (i) is generated. It is noted that a target cycle data Tref (0), which is the initial value of the target cycle data, represents a time period that has passed from the start of the process to a time when the first, namely, a $0^{th}$ reference pulse signal Ps (0) is generated.

The measured cycle recording portion 822 records measured cycle data Tenc into one of the second data buffers 8250 each time an encoder pulse signal Pe is generated, wherein the measured cycle data Tenc represents a time period that has passed from the previous pulse generation of an encoder pulse signal Pe. Accordingly, the measured cycle recording portion 822 sequentially records the measured cycle data Tenc into the second data buffers 8250 of the second ring buffer 825. At each recording of the measured cycle data Tenc, the measured cycle recording portion 822 notifies the phase error calculating portion 823 of the buffer number of second data buffer 8250 in which the latest piece of measured cycle data Tenc is recorded.

It is noted that the step in which the measured cycle recording portion 822 calculates and records the measured cycle data Tenc is an example of the measured cycle recording step.

In the example of FIG. 11, at timings t2, t4, t7, and t9 of the rising edge of the encoder pulse signal Pe, the measured cycle recording portion 822 records pieces of measured cycle data Tenc that are obtained at those timings, into the second data buffers 8250 of buffer numbers 0 to 3. Furthermore, at the timings t2, t4, t7, and t9, the measured cycle recording portion 822 notifies the phase error calculating portion 823 of the buffer numbers 0, 1, 2, and 3 that are assigned to the second data buffers 8250 in which the pieces of measured cycle data Tenc obtained at those timings are recorded.

A $i^{th}$ measured cycle data Tenc (j) that is recorded when a $i^{th}$ encoder pulse signal Pe (j) is generated, represents a time period that has passed from a time when a $(j-1)^{th}$ encoder pulse signal Pe (j−1) was generated to a time when the $j^{th}$ encoder pulse signal Pe (j) is generated. It is noted that the measured cycle data Tenc (0), which is the initial value of the measured cycle data, represents a time period that has passed from the start of the process to a time when the first, namely, the $0^{th}$ encoder pulse signal Pe (0) is generated.

It is noted that the target cycle data Tref (i) and the measured cycle data Tenc (j) may be numerical data that represents the time in units of, for example, milliseconds, or numerical data that represents the number of counts of a predetermined clock signal.

The phase error calculating portion 823 calculates the phase error PHE by integrating a difference between the target cycle data Tref and the measured cycle data Tenc that are sequentially recorded in the first data buffers 8240 and the second data buffers 8250 in correspondence with each other in the first ring buffer 824 and the second ring buffer 825, respectively.

A first data buffer 8240 and a second data buffer 8250 into which the target cycle data Tref and the measured cycle data Tenc are recorded at the same timing correspond to each other. That is, in the above-mentioned example, the $0^{th}$, $1^{st}$, $2^{nd}$, and $3^{rd}$ first data buffers 8240 correspond to the $0^{th}$, $1^{st}$, $2^{nd}$, and $3^{rd}$ second data buffers 8250, respectively.

The phase error calculating portion 823 calculates the phase error PHE each time data is recorded into both the first ring buffer 824 and the second ring buffer 825 that correspond to each other.

For example, the phase error calculating portion 823 may calculate a $(k+1)^{th}$ phase error PHE (k+1) using the following equation (1) each time data is recorded into both a $k^{th}$ ($0^{th}$ to $3^{rd}$) first ring buffer 824 and a $k^{th}$ ($0^{th}$ to $3^{rd}$) second ring buffer 825. It is noted that the initial value of the phase error PHE (0) is 0.

In addition, when the encoder pulse signal Pe is delayed in phase (position) with respect to the reference pulse signal Ps, the phase error calculating portion 823 may calculate a $(k+1)^{th}$ phase error PHE (k+1) using the following equation (2). Here, "g1" in the equation (2) represents the number of pulses by which the encoder pulse signal Pe is delayed with respect to the reference pulse signal Ps at the time of the calculation. That is, the size of the error pulse EP when the encoder pulse signal Pe is delayed in phase (position) is "g1".

[Equation 2]

$$PHE(k+1) = Tref(k) - Tenc(k) + \sum_{m=(k-g1)}^{k-1} Tref(m) \qquad (2)$$

Similarly, when the encoder pulse signal Pe is advanced in phase (position) with respect to the reference pulse signal Ps, the phase error calculating portion 823 may calculate a $(k+1)^{th}$ phase error PHE (k+1) using the following equation (3). Here, "g2" in the equation (3) represents the number of pulses by which the encoder pulse signal Pe is advanced with respect to the reference pulse signal Ps at the time of the calculation. That is, the size of the error pulse EP when the encoder pulse signal Pe is advanced in phase (position) is "g2".

[Equation 3]

$$PHE(k+1) = Tref(k) - Tenc(k) + \sum_{m=(k-g2)}^{k-1} Tenc(m) \quad (3)$$

The equations (1), (2) and (3) are each used to integrate a difference between the target cycle data Tref and the measured cycle data Tenc that are sequentially recorded in the first data buffers 8240 and the second data buffers 8250 in correspondence with each other in the first ring buffer 824 and the second ring buffer 825, respectively.

The phase error PHE, which is an integrated value of the difference, corresponds to an error (positional error) of a measured position with respect to a target position of the motor 40 in the rotation direction of the motor 40. The phase error PHE, different from a general phase error that changes only in a range of less than one cycle of the reference pulse signal Ps, can change in a range that exceeds one cycle of the reference pulse signal Ps.

When the calculated phase error PHE (k+1) is 0, the reference pulse signal Ps matches the encoder pulse signal Pe in phase. When the calculated phase error PHE (k+1) is a positive value, the reference pulse signal Ps is advanced in phase with respect to the encoder pulse signal Pe. When the calculated phase error PHE (k+1) is a negative value, the reference pulse signal Ps is delayed in phase with respect to the encoder pulse signal Pe.

For example, when the reference pulse signal Ps matches or is advanced in phase with respect to the encoder pulse signal Pe, the phase error calculating portion 823, each time it receives a number "j" from the measured cycle recording portion 822, sets k=j and calculates the (k+1)$^{th}$ phase error PHE (k+1).

On the other hand, when the reference pulse signal Ps is delayed in phase with respect to the encoder pulse signal Pe, the phase error calculating portion 823, each time it receives a number "i" from the target cycle recording portion 821, sets k=i and calculates the (k+1)$^{th}$ phase error PHE (k+1).

It is noted that the step in which the phase error calculating portion 823 calculates the phase error PHE is an example of the phase error calculating step.

In the example of FIG. 11, at timing t2, data recording to the 0$^{th}$ first data buffer 8240 and the 0$^{th}$ second data buffer 8250 corresponding thereto is completed. Thus the phase error calculating portion 823 calculates the 1$^{st}$ phase error PHE (1) by applying the 0$^{th}$ target cycle data Tref (0) and the 0$^{th}$ measured cycle data Tenc (0) to the equation (1).

Similarly, at timing t4, data recording to the 1$^{st}$ first data buffer 8240 and the 1$^{st}$ second data buffer 8250 corresponding thereto is completed. Thus the phase error calculating portion 823 calculates the 2$^{nd}$ phase error PHE (2) by applying the 1$^{st}$ target cycle data Tref (1) and the 1$^{st}$ measured cycle data Tenc (1) to the equation (1).

Similarly, at timing t7, the phase error calculating portion 823 calculates the 3$^{rd}$ phase error PHE (3). In addition, similarly, at timing t9, the phase error calculating portion 823 calculates the 0$^{th}$ phase error PHE (0) again.

The phase errors PHE are sequentially calculated as described above, and the latest phase error PHE is input into the motor power adjustment portion 83. Furthermore, when the control mode is the first mode, the first power adjustment portion 83 adjusts the power supplied to the motor 40 in a direction where the phase error PHE is reduced.

When the control mode is the first mode, the phase error PHE, which is an integrated value of a difference in generation cycle between the reference pulse signal Ps and the encoder pulse signal Pe, is used as a deviation in the feedback control of the motor 40. As a result, even if the phase error PHE (deviation) is a time difference of less than one pulse, the power supplied to the motor 40 is adjusted in a direction where the time difference is eliminated. As a result, the resolution of the position measurement based on the encoder pulse signal Pe does not become a hindrance to the control ability, and it is possible to control the position of the motor 40 with a high precision.

Furthermore, the latest three or more pieces of target cycle data Tref and the latest three or more pieces of measured cycle data Tenc are stored into the two ring buffers 824 and 825, respectively. As a result, if the phase difference (deviation) between the reference pulse signal Ps and the encoder pulse signal Pe exceeds the generation cycle of either one of the two pulse signals, the phase error PHE is calculated correctly.

That is, suppose that each of the two ring buffers 824 and 825 has N data buffers, if the phase difference between the two pulse signals becomes (N−1) times the generation cycle of either one of the two pulse signals, information of the difference between the target position and the measured position of the motor 40 is not lost. As a result, the position of the motor 40 can be controlled correctly even in the case where, as in the start or stop of the motor 40, the speed of the motor 40 is relatively largely changed, that is, in the case where the difference between the target position and the measured position becomes large.

In addition, in the motor power adjustment portion 83, the pulse width modulating portion 871 adjusts the duty ratio of the drive pulse signal Pd supplied to the motor 40, based on the input signal (the power supply amount signal Xo) that reflects the proportional element of the phase error PHE. Such a control is effective as a control for reducing the phase error PHE quickly.

In the present embodiment, the pulse width modulating portion 871 adjusts the duty ratio of the drive pulse signal Pd supplied to the motor 40, based on the input signal (the power supply amount signal Xo) that reflects also the integral element of the phase error PHE. This makes it possible to prevent an offset from being generated when the position of the motor 40 is controlled.

Meanwhile, when, for example, the motor 40 is started or stopped, the difference in phase (the phase error PHE) between the reference pulse signal Ps and the encoder pulse signal Pe may become large. As a result, to prevent the phase comparison portion 82 from losing the information of the difference between the target position and the measured position in a more reliable manner, it is necessary to increase the number of data buffers included in each of the first ring buffer 824 and the second ring buffer 825.

On the other hand, it is preferable for the memory 820 to have as small a capacity as possible in order to reduce the power consumption and cost of the motor control device 80B. In addition, high robustness is required such that the control converges in a reliable manner even if the phase error PHE becomes larger than expected.

As described above, the motor control device 80B includes the error pulse counting portion 84, the second power adjustment portion 85, and the signal selection portion 86. With this configuration, even when each of the first ring buffer 824 and the second ring buffer 825 includes a small number of data buffers, the position control of the motor 40 is allowed to converge in a reliable manner. This is described in the following.

[Switch of Control Mode]

When the error pulse EP is less than a predetermined threshold SL that is equal to or less than the number of first data buffers 8240, the signal selection portion 86 selects the first control signal X1. This allows the control mode to be switched to the first mode. The state where the error pulse EP is less than the number of first data buffers 8240 is a state where the information of the difference between the target position and the measured position is not lost. For example, the threshold SL may be equal to the number of first data buffers 8240. However, the threshold SL should be 2 or more.

In addition, at least when the error pulse EP is equal to or more than the number of the first data buffers 8240, the signal selection portion 86 selects the second control signal X2. The state where the error pulse EP is equal to or more than the number of first data buffers 8240 is a state where the information of the difference between the target position and the measured position is lost.

For example, the signal selection portion 86 selects the second control signal X2 when the error pulse EP is equal to or more than the threshold SL. This allows the control mode to be switched to the second mode. The state where the error pulse EP is equal to or more than the number of first data buffers 8240 is a state where the information of the difference between the target position and the measured position is lost.

As a result, when the error pulse EP is less than the number of first data buffers 8240, the first power adjustment portion 83 adjusts the power supplied to the motor 40 in a direction where the phase error PHE is reduced. It is noted that the step in which the motor power adjustment portion 83 adjusts the power supplied to the motor 40 by outputting the first control signal X1 is an example of the first power adjustment step.

On the other hand, when the error pulse EP is equal to or more than the number of first data buffers 8240, the second power adjustment portion 85 adjusts the power supplied to the motor 40 in a direction where the error pulses EP are reduced. It is noted that the step in which the second power adjustment portion 85 adjusts the power supplied to the motor 40 by outputting the second control signal X2 is an example of the second power adjustment step.

[Switch from First Mode to Second Mode]

Figure 12:
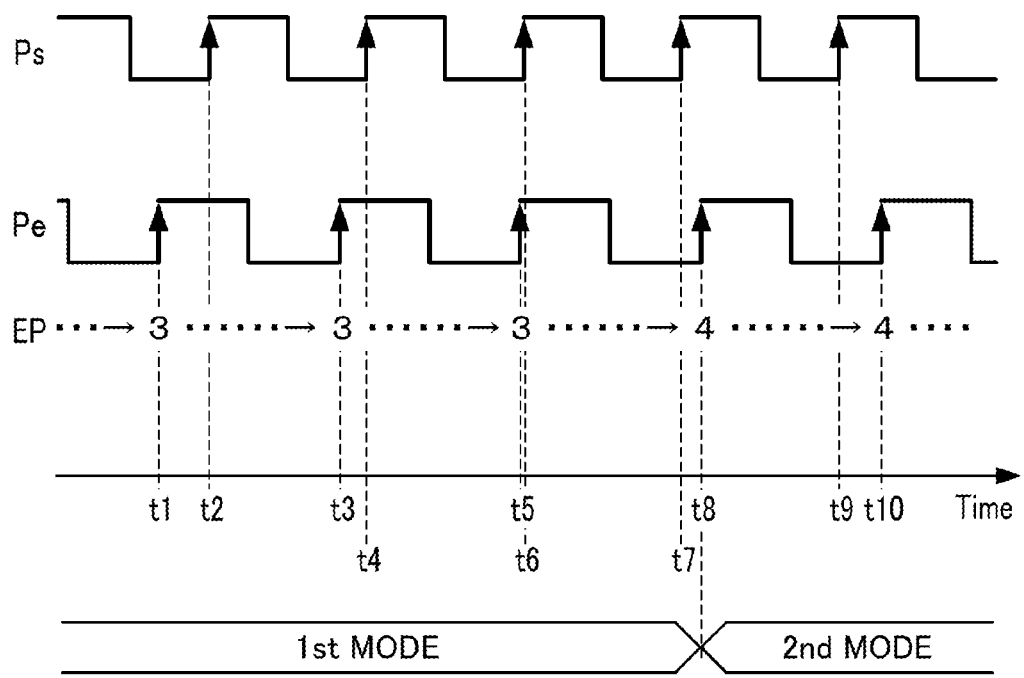
FIG. 12 is a diagram showing an example of a time chart of the reference pulse signal and the encoder pulse signal when the control mode of the motor control device according to the third embodiment of the present invention switches from the first mode to the second mode.

The following describes, with reference to FIG. 12, a specific example in which the control mode switches from the first mode to the second mode. In the following example, the number N of first data buffers 8240 and the threshold SL are both 4.

FIG. 12 shows an example of a time chart of the reference pulse signal Ps and the encoder pulse signal Pe when the control mode of the motor control device 80B switches from the first mode to the second mode.

In the example of FIG. 12, at the timings t2, t4, t6, t7, and t9 of the rising edge of the reference pulse signal Ps, the target cycle recording portion 821 records pieces of target cycle data Tref that are obtained at those timings, into the first data buffers 8240. Similarly, at the timings t1, t3, t5, t8, and t10 of the rising edge of the encoder pulse signal Pe, the measured cycle recording portion 822 records pieces of measured cycle data Tenc that are obtained at those timings, into the second data buffers 8250.

In addition, it is supposed that at timing t1, the encoder pulse signal Pe is delayed in phase (position) with respect to the reference pulse signal Ps, and the error pulse EP is 3.

In the time chart of FIG. 12, one rising edge of the reference pulse signal Ps exists both between timing t1 and timing t3 and between timing t3 and timing t5. As a result, at timing t3 and at timing t5, the error pulse EP is 3 the same as that at timing t1.

As a result, during a time period from timing t1 to timing t5, the error pulse EP is less than the threshold SL, and the signal selection portion 86 selects the first control signal X1. Thus during the time period from timing t1 to timing t5, the control mode is the first mode. This allows the motor 40 to be controlled with a high precision.

Next, two rising edges of the reference pulse signal Ps exist between timing t5 and timing t8. Furthermore, one rising edge of the reference pulse signal Ps exists between timing t8 and timing t10. As a result, the error pulse EP at timing t8 is 4, having increased by one from that at timing t5. In addition, the error pulse EP at timing t10 is 4, the same as that at timing t8.

As a result, during a time period from timing t8 to timing t10, the error pulse EP is equal to or more than the threshold SL, and the signal selection portion 86 selects the second control signal X2. Thus during the time period from timing t8 to timing t10, the control mode is the second mode.

During the time period from timing t8 to timing t10, the error pulse EP is equal to or more than the number N of first data buffers 8240. In this case, the information of the difference between the target position and the measured position is lost in the two ring buffers 824 and 825. As a result, the feedback control is performed in the second mode using the error pulse EP. With this configuration, it is possible to cause the position of the motor to converge to the target position based on the reference pulse signal Ps. In addition, even when the phase error PHE becomes larger than expected, the control converges in a reliable manner, and the robustness is increased.

[Switch from Second Mode to First Mode]

The following describes a specific example in which the control mode switches from the second mode to the first mode. In the following example, the number N of first data buffers 8240 and the threshold SL are both 4.

Figure 13:
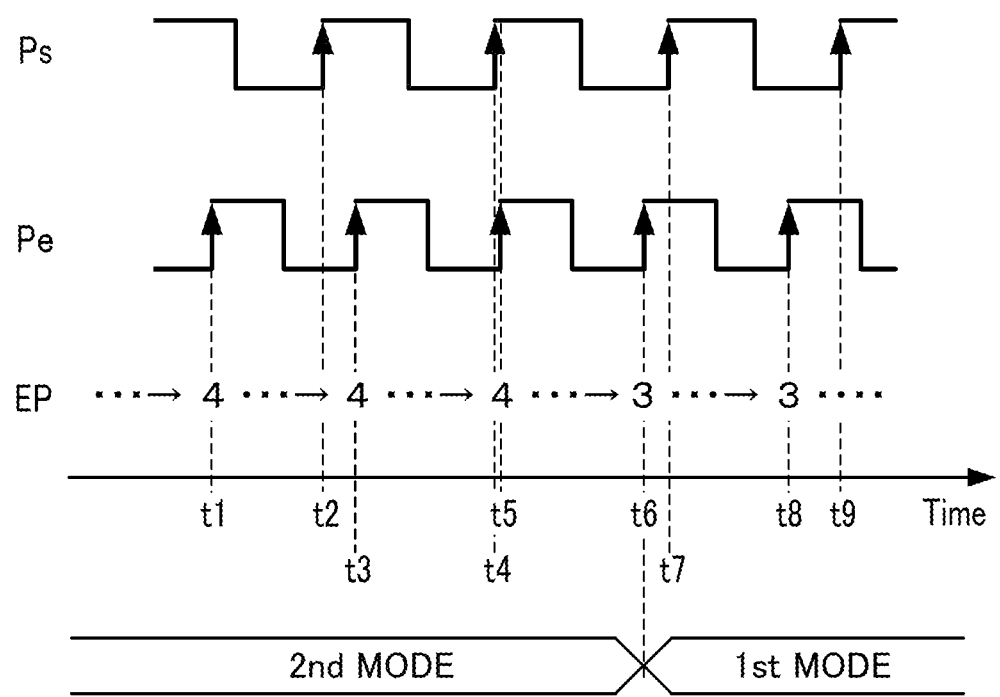
FIG. 13 is a diagram showing an example of a time chart of the reference pulse signal and the encoder pulse signal when the control mode of the motor control device according to the third embodiment of the present invention switches from the second mode to the first mode.

FIG. 13 shows an example of a time chart of the reference pulse signal Ps and the encoder pulse signal Pe when the control mode in the motor control device 80B switches from the second mode to the first mode.

In the example of FIG. 13, at the timings t2, t4, t7, and t9 of the rising edge of the reference pulse signal Ps, the target cycle recording portion 821 records pieces of target cycle data Tref that are obtained at those timings, into the first data buffers 8240. Similarly, at the timings t1, t3, t5, t6, and t8 of the rising edge of the encoder pulse signal Pe, the measured cycle recording portion 822 records pieces of measured cycle data Tenc that are obtained at those timings, into the second data buffers 8250.

In addition, it is supposed that at timing t1, the encoder pulse signal Pe is delayed in phase (position) with respect to the reference pulse signal Ps, and the error pulse EP is 4.

In the time chart of FIG. 13, one rising edge of the reference pulse signal Ps exists both between timing t1 and timing t3 and between timing t3 and timing t5. As a result, at timing t3 and at timing t5, the error pulse EP is 4 the same as at that timing t1.

As a result, during a time period from timing t1 to timing t5, the error pulse EP is equal to or more than the threshold SL, and the signal selection portion 86 selects the second control signal X2. Thus during the time period from timing t1 to timing t5, the control mode is the second mode. This allows the motor 40 to be controlled based on the error pulse EP.

Next, no rising edge of the reference pulse signal Ps exists between timing t5 and timing t6. Furthermore, one rising edge of the reference pulse signal Ps exists between timing t6 and timing t8. As a result, the error pulse EP at timing t6 is 3, having decreased by one from that at timing t5. In addition, the error pulse EP at timing t8 is 3, the same as that at timing t6.

As a result, during a time period from timing t6 to timing t8, the error pulse EP is less than the threshold SL, and the signal selection portion 86 selects the first control signal X1. Thus during the time period from timing t6 to timing t8, the control mode is the first mode.

During the time period from timing t1 to timing t6, the error pulse EP is equal to or more than the number N of first data buffers 8240. In this case, the information of the difference between the target position and the measured position is lost in the two ring buffers 824 and 825. As a result, the feedback control is performed in the second mode using the error pulse EP. With this configuration, it is possible to cause the position of the motor to converge to the target position based on the reference pulse signal Ps.

On the other hand, during the time period from timing t6 to timing t8, the error pulse EP is less than the number N of first data buffers 8240. As a result, the information of the difference between the target position and the measured position that was lost once, is recovered.

That is, by applying data recorded in the two ring buffers 824 and 825 to the equation (2) or (3), it is possible to calculate the phase error PHE that reflects correct position information. This allows the position of the motor to quickly converge to the target position based on the phase error PHE.

In addition, it is possible to reduce the capacity of the two first ring buffers 824 and 825. This leads to the reduction of the power consumption and cost of the motor control device 80B.

Fourth Embodiment

Figure 14:
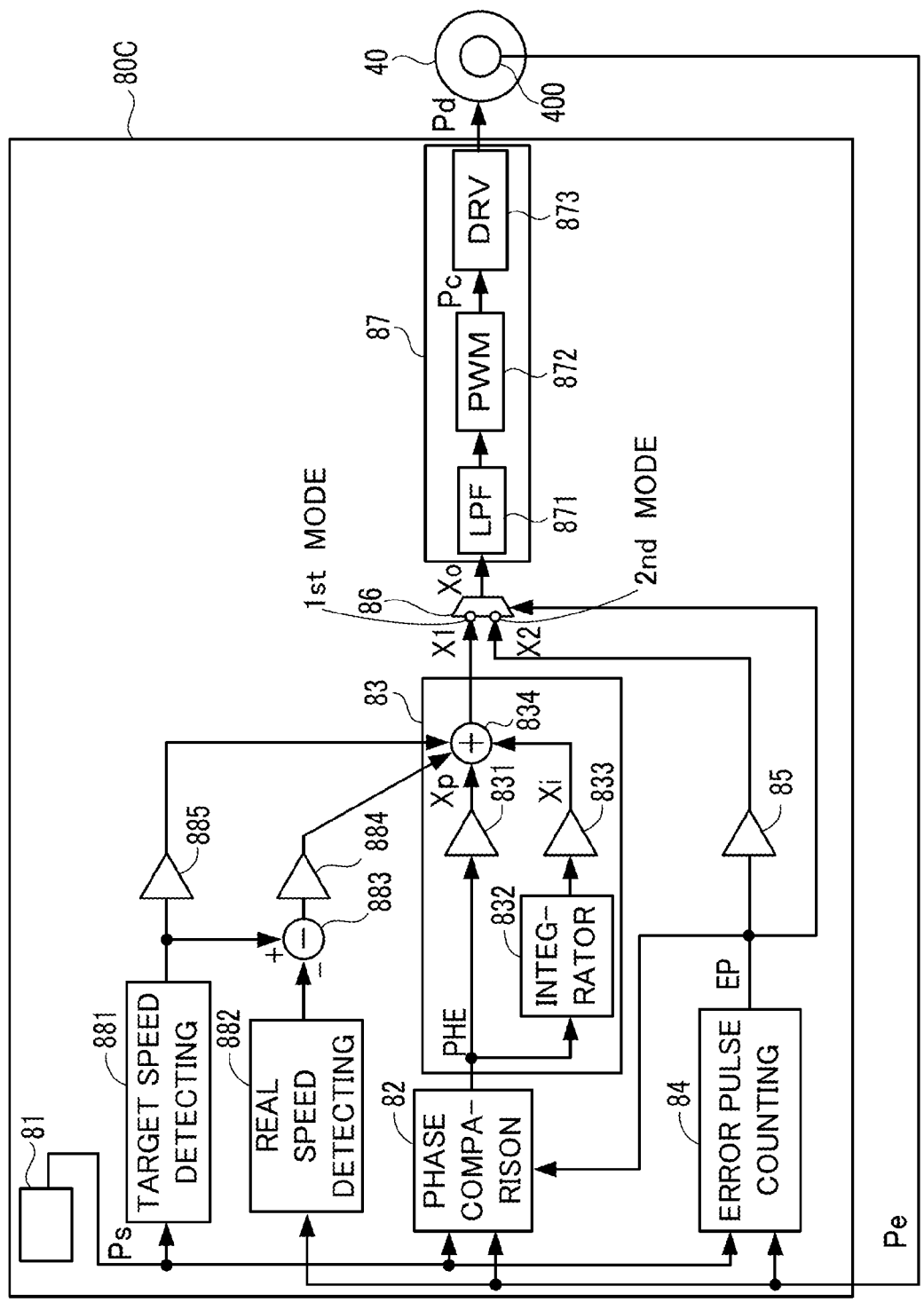
FIG. 14 is a block diagram of the motor control device according to a fourth embodiment of the present invention.

Next, a description is given of a motor control device 80C according to the fourth embodiment of the present invention, with reference to FIG. 14. FIG. 14 is a block diagram of the motor control device 80C. In FIG. 14, the same components as those shown in FIG. 8 are assigned the same reference signs. The following describes the difference of the motor control device 80C from the motor control device 80B.

The motor control device 80C includes, in addition to the components of the motor control device 80B, a target speed detecting portion 881, a real speed detecting portion 882, a subtractor 883, a speed feedback control amplifier 884, and a feed-forward control amplifier 885.

The target speed detecting portion 881 detects (calculates) a target rotation speed of the motor 40 by calculating the inverse number of the generation cycle of the reference pulse signal Ps. Similarly, the real speed detecting portion 882 detects (calculates) a real rotation speed of the motor 40 by calculating the inverse number of the generation cycle of the encoder pulse signal Pe.

The subtractor 883 calculates a speed deviation which is a difference between the target rotation speed and the real rotation speed. The speed feedback control amplifier 884 generates a speed control signal that reflects the speed deviation, by amplifying, with a predetermined gain, a signal that corresponds to the speed deviation.

The feed-forward control amplifier 885 generates a feed-forward control signal that reflects an element of a change of the target rotation speed, by amplifying, with a predetermined gain, a signal that corresponds to the target rotation speed.

The speed control signal and the feed-forward control signal are added by the adder 834 together with the proportional control signal Xp and the integral control signal Xi, and the result is reflected in the first control signal X1.

It is noted that the image forming apparatus according to the fourth embodiment of the present invention has the same configuration as the image forming apparatus 10 except that the motor control device 80 is replaced with the motor control device 80C.

As described above, the motor control device 80C performs the feedback control and the feed-forward control based on the rotation speed of the motor 40, in parallel with the feedback control based on the phase error PHE. This makes it possible to reduce the phase error PHE quickly.

Application Examples

In the motor control devices 80, 80A, 80B, and 80C, the integrator 832 and the integral element amplifier 833 may be omitted.

It is noted that the motor control device, image forming apparatus, motor control method, and method for controlling an image forming apparatus of the present invention may be configured by, within the scope of claims, freely combining the above-described embodiments and application examples, or by modifying the embodiments and application examples or omitting a part thereof.

The invention claimed is:

1. A motor control device comprising:
a target cycle recording portion configured to record target cycle data into one of three or more first data buffers of a first ring buffer each time a reference pulse signal is generated, thereby recording the target cycle data sequentially into the three or more first data buffers, the target cycle data representing a time period that has passed from a previous generation of a reference pulse signal;
a measured cycle recording portion configured to record measured cycle data into one of three or more second data buffers of a second ring buffer each time an encoder pulse signal is generated in synchronization with rotation of a motor, thereby recording the measured cycle data sequentially into the three or more second data buffers, the measured cycle data representing a time period that has passed from a previous generation of an encoder pulse signal, the first data buffers and the second data buffers being same in number;
a phase error calculating portion configured to calculate a phase error by integrating a difference between the target cycle data and the measured cycle data that are sequentially recorded in the first data buffers and the second data buffers respectively in correspondence with each other in the first ring buffer and the second ring buffer; and
a power adjustment portion configured to adjust power supplied to the motor, in a direction where the phase error is reduced.

2. The motor control device according to claim 1, wherein the power adjustment portion includes a pulse width modulating portion configured to adjust a duty ratio of a drive pulse signal that is supplied to the motor, based on an input signal that reflects at least a proportional element of the phase error.

3. An image forming apparatus comprising:

an image carrying member;

a motor configured to drive the image carrying member;

an encoder configured to output an encoder pulse signal in synchronization with rotation of the motor; and the motor control device according to claim 1 configured to adjust the power supplied to the motor.

4. A motor control method comprising:

a target cycle recording step of recording target cycle data into one of three or more first data buffers of a first ring buffer each time a reference pulse signal is generated, thereby recording the target cycle data sequentially into the three or more first data buffers, the target cycle data representing a time period that has passed from a previous generation of a reference pulse signal;

a measured cycle recording step of recording measured cycle data into one of three or more second data buffers of a second ring buffer each time an encoder pulse signal is generated in synchronization with rotation of a motor, thereby recording the measured cycle data sequentially into the three or more second data buffers, the measured cycle data representing a time period that has passed from a previous generation of an encoder pulse signal, the first data buffers and the second data buffers being same in number;

a phase error calculating step of calculating a phase error by integrating a difference between the target cycle data and the measured cycle data that are sequentially recorded in the first data buffers and the second data buffers respectively in correspondence with each other in the first ring buffer and the second ring buffer; and a power adjustment step of adjusting power supplied to the motor, in a direction where the phase error is reduced.

5. A motor control device comprising:

a target cycle recording portion configured to record target cycle data into one of three or more first data buffers of a first ring buffer each time a reference pulse signal is generated, thereby recording the target cycle data sequentially into the three or more first data buffers, the target cycle data representing a time period that has passed from a previous generation of a reference pulse signal;

a measured cycle recording portion configured to record measured cycle data into one of three or more second data buffers of a second ring buffer each time an encoder pulse signal is generated in synchronization with rotation of a motor, thereby recording the measured cycle data sequentially into the three or more second data buffers, the measured cycle data representing a time period that has passed from a previous generation of an encoder pulse signal, the first data buffers and the second data buffers being same in number;

a phase error calculating portion configured to calculate a phase error by integrating a difference between the target cycle data and the measured cycle data that are sequentially recorded in the first data buffers and the second data buffers respectively in correspondence with each other in the first ring buffer and the second ring buffer;

an error pulse counting portion configured to count the number of error pulses of the encoder pulse signal with respect to the reference pulse signal;

a first power adjustment portion configured to, when the number of error pulses is less than the number of the first data buffers, adjust power supplied to the motor in a direction where the phase error is reduced; and a second power adjustment portion configured to, when the number of error pulses is equal to or more than the number of the first data buffers, adjust the power supplied to the motor in a direction where the number of error pulses is reduced.

6. The motor control device according to claim 5, wherein the first power adjustment portion includes a pulse width modulating portion configured to adjust a duty ratio of a drive pulse signal that is supplied to the motor, based on an input signal that reflects at least a proportional element of the phase error.

7. An image forming apparatus comprising:

an image carrying member;

a motor configured to drive the image carrying member;

an encoder configured to output an encoder pulse signal in synchronization with rotation of the motor; and the motor control device according to claim 5 configured to adjust the power supplied to the motor.

* * * * *